UNITED STATES PATENT OFFICE 2,223,683

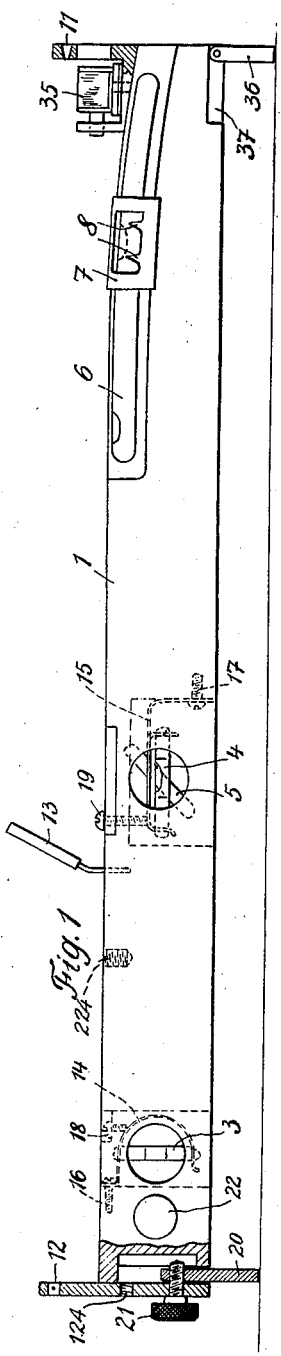

MEASURING OR SURVEYING INSTRUMENT

Hans Gruber, Muhldorf, Upper Bavaria, Germany

Application August 3, 1938, Serial No. 222,910
In Germany August 10, 1937

3 Claims. (Cl. 33—212)

This invention relates to a measuring or surveying instrument for use in the building trade, or for other purposes, which consists of two parts which can be assembled together. Each of the parts can be used separately for a number of different purposes and when assembled together the instrument can be employed for making particularly accurate measurements, in connection for example with the construction of buildings.

An object of the invention is to provide an improved instrument composed of two parts, which can be used separately or in combination. The instrument can be used for levelling, measuring heights, gradients and inclinations, and for plumbing and like purposes.

An instrument in accordance with the invention is illustrated by way of example in the accompanying drawing, in which Fig. 1 is a side elevation partly in section of one part of the instrument, Fig. 2 is a plan of Fig. 1, Fig. 3 is a side view of the other part, Figs. 4 and 5 are diagrams showing the two parts of the assembled device in two different positions.

Referring to the drawing, the instrument comprises a hydrostatic level 1 of the usual size and shape and a removable part 2 which contains a tubular level bent to the shape of an arc, the length of which is an eighth of the circumference of the circle of which it forms part.

In the part 1 which is made of wood or aluminium are fitted three straight tubular levels, namely the vertical level 3, the horizontal level 4 and the oblique level 5 which is inclined at an angle of 45° to the horizontal level and is covered together with the latter both laterally and also on top by a glass window. There is also fitted at the end of the part 1 a curved tubular level 6 which, in order to obtain accuracy of measurement, is preferably bent to the form of a small arc of a circle of large radius. This level, which is therefore very slightly curved, is inlet in the body of the part 1 in such a manner that it is visible not only from the top but also from both sides and obliquely from below.

For determining the position of the air bubble in the level 6 there is provided a slider 7 which, in any position of the instrument, enables the position of the air bubble to be fixed by means of the pointer 8 and to be read off by means of the line 9 on a scale which is fitted on the top of the part 2 at the sides of the level 6. A sighting device is formed by an eyepiece 11 and an objective 12 and this can be supplemented by means of a mirror 13 which can be fitted on the part 1 in such a way that the positions of the air bubbles in the levels 4 and 5 can be seen by the observer simultaneously with the object. In front of the eyepiece 11 is fitted a rotatable mirror 35 by means of which an object which is situated out of the line of the axis of the instrument can be viewed.

The levels 3 and 4 are adjustably arranged in order on the one hand to be able to regulate them if need be and on the other hand to be able to undertake the surveying of gradients as hereinafter described. The adjustability is obtained by clamping the levels 3 and 4 at both ends in holes in suitably bent steel springs 14 and 15 respectively which are fixed by means of screws 16 and 17 in the interior of the level and can be moved by means of adjusting screws 18 and 19 in such a manner that the position of the levels which are held by the springs can be easily altered.

On the straight end of the part 1 is fitted an extension 20 which is adjustable and provided with a millimetre scale or with other scale divisions. This extension 20 can be pushed into or drawn out of the part 1 by means of a screw 21 which is movable in an elongated hole and can be fixed in any desired position. At the other end of the part 1 there is a corresponding extension piece 36 which can be turned upwards into a recess 37.

At the end of the part 1 which carries the extension 20 are fitted on a rotatable spindle situated in the line of its centre of gravity, two buttons 22 and 23, which are used for carrying out plumbing operations with the part 1.

The part 2 is fixed on the part 1 by means of a screw 24 and can be connected either as shown in Fig. 4 after removal of screw 21 by engagement of screw 24 through threaded opening 124, or as shown in Fig. 5, by engagement of screw 24 in threaded opening 224 in such a manner that the longer arm of the right angle bears either against the end or against the longitudinal surface of the part 1. The essential feature of the part 2 is a tubular level 25 which is bent into the form of an arc of a length equal to an eighth of the circumference of the circle and which is inlet in the part 2 which is of corresponding arcuate shape. This arc is provided laterally of the level with a scale and a slider 26 which is connected by means of a pin 27 and a slot 28 to a rotatable carrier 29 of a pivoted mirror 30. This mirror enables the observer using the sights 31 and 32 to see the state of the air bubble in the level 25. The sight 31 is pivoted and can lie against the arcuate surface of the part 2 being swung outwards when this part is used.

The part 2 is preferably made of cast aluminium and carries a further straight tubular level 33.

The curved levels 6 and 25 can be provided with a number of different scales which enable the gradients and inclinations measured to be read off directly in angular degrees, percentages or other values.

The instrument which has been described is very handy and can be used for a large number of different purposes and is superior in this respect and also in the accuracy of the measurements obtained to all instruments which have hitherto been employed for similar purposes.

The part 1 of the instrument can not only be used, like all instruments having horizontal and vertical levels, for horizontal and vertical determinations but can also be used, owing to the inclusion of the slightly curved level 6, for the determination of quite small deviations from the horizontal, as well as for plumbing and measuring the height of a distant object.

The plumbing, for example, of a structural upright of a structure is done as follows:

The part 1 is held up with the finger and thumb on the buttons 22 and 23 and, when the instrument is suspended, the structure is sighted along the longitudinal edge of the level.

For measuring the heights of houses, towers or other structures, the sights 11 and 12 of the part 1 are directed on the top of the building and the observer then moves forwards or backwards until the air bubble in the level 5 is horizontal. After this it is only necessary to measure the height $a$ of the observer's eye above the ground and the distance $l$ of the observer from the building in order to determine the total height $h+a=l+a$ of the building above the ground.

When levelling with the aid of the part 1, assuming that the level 6 is curved into the arc of a circle of radius equal to 2 metres, the accuracy of measurement is such that a division on the scale indicates a departure from the horizontal of ½ mm. in 1 metre.

The visibility of the level 6 both from the sides and from below is of particular advantage when working in mines and canals and also when laying pipes and conduits in which case the extensions 20 and 36 act as supports. On the other hand in the construction of any surfaces having a definite slope or running at a definite angle to the horizontal or vertical the extension 20 on the part 1 in combination with the adjustability of the levels 3 and 4 is of particular use. Thus, for example, if a chimney is to be constructed which decreases by 12 mm. per metre of height, the extension 20 is drawn out to a distance of 12 mm. and fixed by its screw, and the instrument is placed on an accurately vertical surface so that at its lower end the extension and at its upper end the edge of the instrument itself is supported against the vertical surface. Then the level 3 is adjusted by means of the screw 18 until the air bubble is central and the extension 20 is pushed back again into the instrument. When the instrument is now placed with its base on the brickwork it indicates, when the level 3 is horizontal, that the reduction of the chimney is the desired 12 mm. per metre.

Obviously a similar procedure is adopted with the extension 20 when definite departures from the horizontal have to be maintained. In this case the instrument is placed on a horizontal surface and the level 4 is adjusted by means of the screw 19.

Verticals and horizontals can also be determined by means of the part 2 of the instrument although with somewhat less accuracy. For determining the horizontal the part 2 is set up on its shorter arm and the level 33 is observed; or, the observation may be made with greater accuracy by placing the longer arm on the surface to be measured and observing the level 35. Verticals are determined by placing the long arm on a vertical surface and adjusting until the level 33 is horizontal.

The part 2 also enables inclinations and gradients between 0°–45° and 45°–90° to be measured according as to whether the long or the short arm of the right angle is placed on the inclined surface to be measured. Although in this case the accuracy of the measurement is not extremely great this part is useful for mountain climbers, skiers and the like, since, owing to its light weight and small size, it can be carried anywhere and unreliable estimates need no longer be made.

With the instrument composed of the two parts assembled together, all gradients and inclinations round the periphery of a complete circle, that is to say from 0°–360°, can be determined, in which case the parts are placed on the gradient to be measured for measurements of 0°–45°, 45°–90°, 90°–135° and so forth. In this case owing to the great increase in the length of the supporting surface a much greater accuracy can be obtained than with the part 2 alone. Thus for example a reading which is correct to 1° can be obtained directly from the instrument composed of the assembled parts.

I claim:

1. A surveying instrument comprising an elongated member having a straight edge, a horizontal level, the axis of which is parallel to the longitudinal axis of said member, a vertical level, the axis of which is at right angles to said horizontal level, an oblique level, the axis of which is inclined at 45° with respect to said horizontal and vertical levels, a curved level in the form of an arc to which said straight edge is tangential, the axes of said levels being in the vertical plane of said member, a second member having at least one straight edge, a curved level in the form of an arc, the length of which is an eighth of the circumference of the circle of which it forms a part, and means on said members for removably securing the same together with said straight edges in flat engagement with one another.

2. A surveying instrument comprising an elongated member having two straight edges at right angles to one another and parallel to the horizontal and vertical axes, respectively, of said member, horizontal and vertical levels, the axes of which are parallel, respectively, to said horizontal and vertical axes of the member, an oblique level, the axis of which is inclined at 45° with respect to said horizontal and vertical levels, the axes of said levels being in the vertical plane of said member, a second member having at least one straight edge, a curved level in the form of an arc, the length of which is an eighth of the circumference of the circle of which it forms a part, and means on said members for removably securing the same together with said straight edge of said second member in flat engagement, selectively, with one of said straight edges of the first-mentioned member.

3. In a surveying instrument as claimed in claim 2, a mirror, and sliding pivot means on said second member adjustably supporting said mirror above said curved level for sliding adjustment over the length thereof, whereby the curved level may be viewed when said second member is engaged with either edge of the first-mentioned member.

HANS GRUBER.